United States Patent [19]

Kofler

[11] Patent Number: 4,786,033

[45] Date of Patent: Nov. 22, 1988

[54] LEAF SPRING OF COMPOSITE FIBRE PLASTICS MATERIAL

[76] Inventor: Walter Kofler, Tschiggfreystrasse 40, A-6020 Innsbruck, Austria

[21] Appl. No.: 929,810

[22] Filed: Nov. 13, 1986

[30] Foreign Application Priority Data

Nov. 14, 1985 [AT] Austria .................................. 3317/85

[51] Int. Cl.⁴ ........................... F16F 1/18; B29L 67/14
[52] U.S. Cl. ...................................... 267/47; 156/185; 156/191; 267/36.1; 267/148
[58] Field of Search ................... 267/47, 36 R, 38, 39, 267/48, 49, 50, 148, 158, 149, 36.1; 156/185, 195, 191, 301, 297, 298, 174

[56] References Cited

U.S. PATENT DOCUMENTS

| | | |
|---|---|---|
| 3,900,357 | 8/1975 | Huchette et al. ...................... 267/47 |
| 4,530,490 | 7/1985 | Misumi et al. ........................ 267/47 |
| 4,659,071 | 4/1987 | Woltron ............................. 267/47 X |

FOREIGN PATENT DOCUMENTS 0163741 10/1982 Japan ...................................... 267/47

Primary Examiner—George E. A. Halvosa
Assistant Examiner—Matthew C. Graham
Attorney, Agent, or Firm—Wenderoth, Lind & Ponack

[57] ABSTRACT

A leaf spring of composite fibre plastics material comprising a plurality of layers of fibre material which are disposed in superposed relationship and which are embedded in a synthetic resin matrix, wherein there are provided outer layers (1) of fibre material which extend over the entire length of the leaf spring and which are associated with the tension and compression zones and shorter inner layers (2) of fibre material of a length which is stepped in a direction towards the central zone (N). In addition to the stepped inner layers (1), also provided in the region between the neutral zone (N) and the tension and compression zones respectively are intermediate layers (3) of fibre material, the length of which is greater than the length of the adjacent inner layers (2) of fibre material.

13 Claims, 3 Drawing Sheets

LEAF SPRING OF COMPOSITE FIBRE PLASTICS MATERIAL

The invention relates to a leaf spring comprising composite fibre plastics material, with a thickness which decreases, preferably towards both sides, in the longitudinal direction from a region of maximum thickness, and preferably with a width which is the same over the entire length, comprising a plurality of fibre material layers which are disposed in superposed relationship and which are embedded in a synthetic resin matrix, wherein there are provided outer fibre material layers which extend over the entire length of the leaf spring and which are associated with the tension and compression zones, and shorter inner fibre material layers of a length which is stepped in a direction towards the neutral zone.

There are already a number of proposals for producing leaf springs of that kind from composite fibre plastics materials and using them instead of laminated leaf springs (parabolic springs) of steel, for example for commercial vehicles (see for example U.S. Pat. No. 3,900,357). If consideration is given to the bending threshold stresses and the number of load cycles which for example a leaf spring comprising composite glass fibre epoxy resin material withstands, then that would be an entirely achievable aim, in which respect the composite fibre material synthetic resin leaf spring has the great advantage of about a 50% saving in weight, in comparison with the steel leaf spring.

A critical aspect however in leaf springs of composite fibre plastics materials are the shear stresses which occur in the planes of the layers of fibre material or between those layers. In the case of leaf springs which are subjected to a bending loading, those shear stresses increase from the outer compression and tension zones of the leaf spring in a direction towards the neutral zone (neutral plane, central plane) and from the region of maximum thickness of the leaf spring to the ends of the spring. Those stress peaks at the ends of the spring and the fact that, in relation to composite fibre plastic materials, the interlaminar shear threshold strength is relatively low (it is lower than the bending threshold strength), frequently result in the composite fibre plastics body splitting open along the neutral zone.

That problem is known and to solve it, it has been proposed for example that the composite fibre plastics leaf spring should be prevented from splitting open by means of layers of fibre which are arranged perpendicularly to the surface of the spring and which extend in the longitudinal direction of the spring (European laid-open application No 65 087). However such a construction is too expensive to manufacture and is therefore not suitable for mass production, from the cost point of view. Recent publications also refer to the problem of the shear stresses in composite fibre plastics leaf springs, but they do not set forth any proposals in regard to solving this problem (see the journal 'Kunststoffe' 75, 1985, No 6, pages 355 ff).

SUMMARY OF THE INVENTION

The object of the present invention is to produce, without incurring a high level of expenditure, a leaf spring of composite fibre plastics materials in which the shear stresses which occur under a bending loading are better controlled and splitting open of the leaf spring along the central plane when subjected to the usual loadings can be avoided.

In accordance with the invention, this object is achieved in that also arranged in the region between the neutral zone and the tension and compression zone, in addition to the stepped inner layers of fibre material, are intermediate layers of fibre material, the length of the intermediate layers being greater than the length of the adjacent inner layers of fibre material.

In comparison with a conventional arrangement of the layers of fiber material (for example as shown in FIG. 4 of U.S. Pat. No. 3,900,357), the feature according to the invention provides for better distribution of the shear stresses over the height and length of the leaf spring, more specifically in such a way as to reduce the shear stress peaks in the neutral zone and in the region of the ends of the spring. An essential consideration in regard to achieving that effect is that the longer layers of fibre material which are shifted from the outer zones towards the neutral zone actually also come to lie between the stepped inner layers of fibre material and are not displaced for example (as shown in FIGS. 9 and 15 of U.S. Pat. No. 3,900,357) into the neutral zone itself because in that case once again only the layers of fiber material which are stepped in the previously known manner would be provided between the outer continuous layers of fibre material and the middle continuous layers of fibre material, and the stepped layers of fibre material referred to above do not contribute to reducing the shear stresses in that known arrangement, without the longer intermediate layers of fibre material.

For reasons relating to installation procedures and for reasons of making advantageous use of material, the leaf spring according to the invention is desirably of rectangular contour (in plan view) and is formed as an 'equal-strength beam', which means a parabolic configuration of the thickness of the leaf spring over the length thereof. The leaf spring according to the invention will also be used predominantly as a 'double-arm' leaf spring, also referred to as a 'semi-elliptical spring'. The feature according to the invention further permits the dimensioning of the spring which is conventional practice in regard to leaf springs, irrespective of whether it is made from steel or composite fibre plastics material, which provides that the maximum thickness of the leaf spring (at the middle in the case of semi-elliptical springs) is double the thickness at the end of the spring. In regard to a leaf spring consisting of composite fibre plastics material, that usually means that half the total layers of fibre material are arranged as outer continuous layers (top and bottom). If, with the arrangement of the layers of fibre material according to the invention, the longer intermediate layers of fibre material were to be disposed in the region of the inner stepped layers of fibre material, as additional continuous layers of fibre material, then the thickness of the leaf spring would increase at the ends thereof. However, it is entirely possible in accordance with the invention for the number of outer layers of fibre material to be reduced and to displace the corresponding number of intermediate layers into the interior of the spring body. More particularly, 60 to 70% of the continuous layers of fibre material are sufficient, depending on the respective type of spring, spring length and loading envisaged, for the outer layer in the tension and compression zones. Therefore up to 30 to 40% of the continuous layers of fibre material can be used as intermediate layers in the interior of the body of the spring.

In accordance with the invention, another possible way of reducing the shear stresses in the region of the ends of the spring and cutting down the shear stress peaks provides that a part of the layers of fibre material of the tension and compression zones and/or of the inner intermediate layers of fibre material is transversely interrupted in the region of the longitudinal ends, in particular in the region of the force-applying means, and preferably at different distances from the spring end.

That is acceptable as on the one hand parts of the force-applying means strengthen the ends of the spring and because the ends of the spring, if the thickness thereof is equal to half the maximum thickness (central thickness) of the leaf spring, in the usual manner, are in any case over-sized and therefore the interruption in some of the outer layers of fibre material has virtually no influence on the bending stiffness of the leaf spring, nor does it increase the risk of breakage.

An optional feature is that one or more of the continuous outer layers of fibre material which are most remote from the surface of the spring and/or one more of the continuous inner intermediate layers of fibre material are taken with their end region through the points of interruption in the separated layers of fibre material, to closer to the surface of the spring, also operates in such a way as to reduce the shear stresses and/or the harmful effects thereof in the region of the ends of the spring.

BRIEF DESCRIPTION OF THE DRAWINGS

The invention is described in greater detail hereinafter by means of embodiments illustrated in the drawings in which:

In each of FIGS. 2 to 5, only half the layers of fibre material of a leaf spring above the neutral zone are shown. The other (lower) half of the layers of fibre material can be arranged in mirror image relationship with respect to the neutral zone. FIGS. 6 and 7 only show the layers of fibre material of the (upper) outer zone of the leaf spring.

DESCRIPTION OF THE PREFERRED EMBODIMENTS

Figure 1:
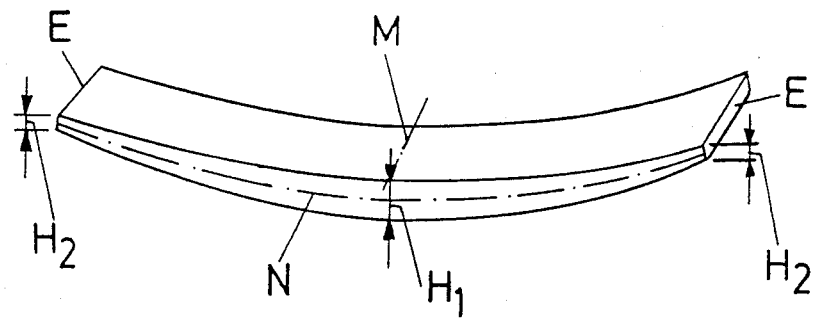
FIG. 1 is a perspective view of a composite fibre plastics leaf spring according to the invention.

The leaf spring shown in FIG. 1 is a double-arm leaf spring (semi-elliptical leaf spring) which, when of corresponding dimensions, is suitable in particular for use in motor vehicles. The outside contour of the leaf spring shown in FIG. 1 is rectangular and the height (thickness) thereof decreases from a maximum height $H_1$ at the center M of the leaf spring towards the two longitudinal ends E thereof, to a height $H_2$ which is half the height $H_1$, more particularly in accordance with a parabolic configuration. The position of the neutral zone N when the leaf spring is subjected to bending loadings is marked in FIG. 1 by a dash-dotted line.

The leaf spring comprises a composite fibre plastics material, for example a glass fibre epoxy resin composite material having a plurality of layers of fibre material which are disposed in superposed relationship and which are embedded in a matrix of synthetic resin. The layers of fibre material may comprise rovings, cloths, for example of an unidirectional cloth which is oriented in the lengthwise direction of the spring, or the like. The layers of fibre material may be impregnated with the synthetic resin directly prior to being put into the pressing mold, or they may also be processed in the form of prepegs.

Figure 2:
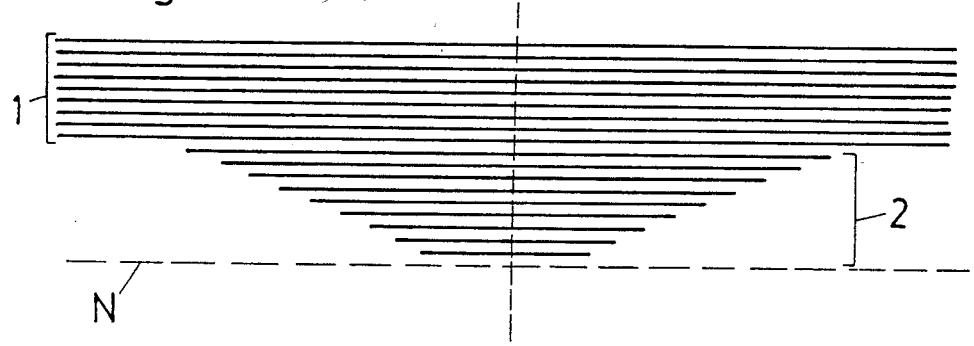
FIG. 2 is a diagrammatic view of a known arrangement of layers of fibre material.

The arrangement of the layers of fibre material in accordance with the known state of the art is shown in FIG. 2. As illustrated therein, provided on both sides of the neutral zone N are outer layers 1 of fibre material, which extend continuously over the entire length of the leaf spring. Provided within the outer layers 1 of fibre material are shorter inner layers 2 of fibre material, of a length which is stepped in a direction towards the central zone.

Figure 3:
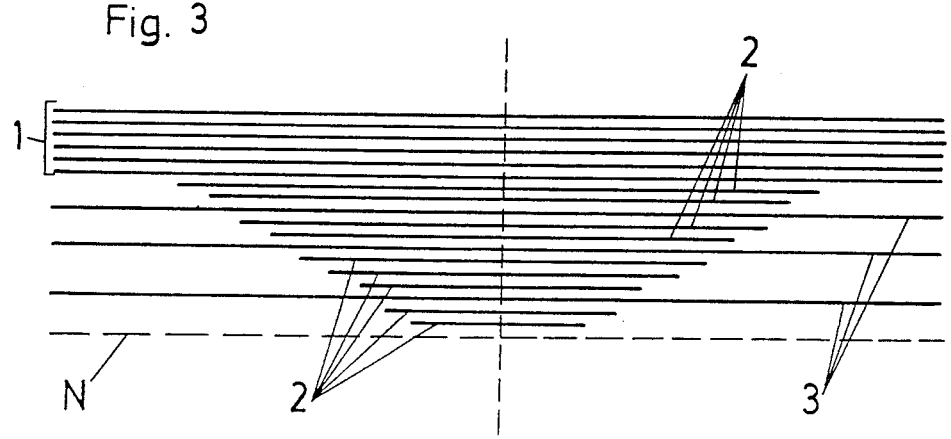
FIGS. 3, 4, 5, 6, and 7 are diagrammatic views of various embodiments of arrangements according to the invention of the layers of fibre material.

In accordance with the invention, as shown in FIG. 3, arranged between individual ones of the stepped inner layers 2 are intermediate layers 3 of fibre material, which extend continuously over the length of the leaf spring. The number of outer continuous layers 1 which are arranged in the tension and compression zones is reduced in comparison with the embodiment shown in FIG. 2 (state of the art). Instead, however, there is a corresponding number of continuous layers of fibre material in the form of intermediate layers 3. Although the intermediate layers 3 of fibre material are further away from the surface of the leaf spring than the outer layers 1 of fibre material, nonetheless the intermediate layers 3 also contribute to the strength of the outer zones as those intermediate layers are still at a greater or smaller distance from the neutral zone N.

Figure 4:
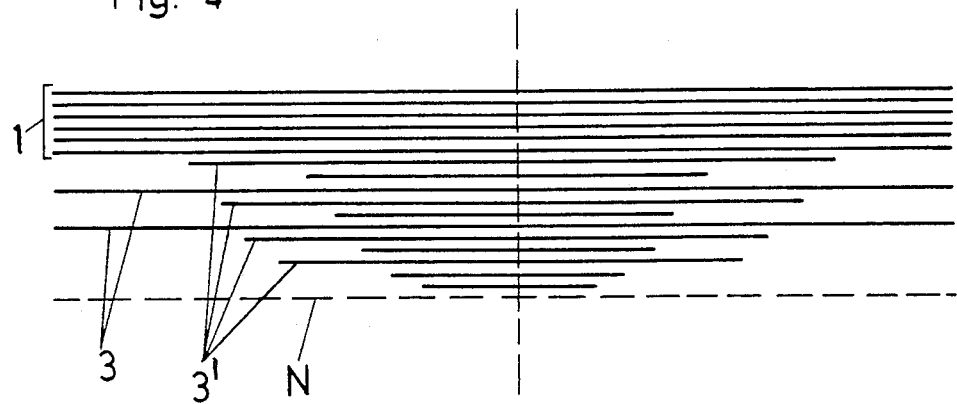

In many cases it may be advantageous if, as shown in FIG. 4, the leaf spring has intermediate layers 3 and 3' of fibre material, of different lengths, wherein the intermediate layers 3 once again extend continuously over the length of the leaf spring and the intermediate layers 3' are shorter in length and are also stepped in length towards the neutral zone N. However, the intermediate layers 3' are also longer than the actual stepped inner layers 2 of fibre material. By virtue of that arrangement, the shear stresses which also occur at the ends of the stepped inner layers 2 of fibre material are more uniformly distributed over the length of the spring.

Figure 5:
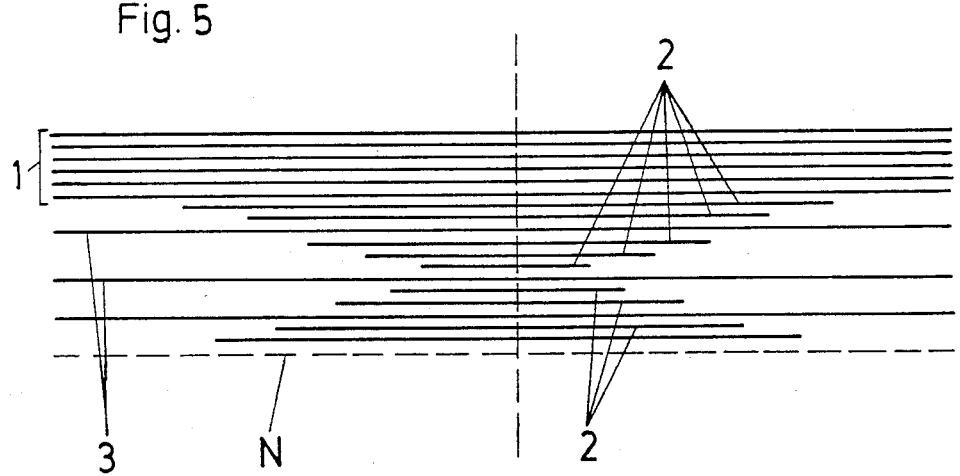

In the case of leaf springs which also have to perform axle guiding or mounting functions, the braking and starting forces give rise to the formation of torques at the central clamping location of the leaf spring, which give rise to considerable shear stresses at both sides thereof. In regard to those leafsprings, it may be advantageous for the stepped layers of fibre material to be arranged in a laminated configuration in such a way that the shortest layers of fibre material come to lie in the middle between the neutral zone N and the outer layers 1 of fibre material. FIG. 5 shows such an arrangement of the layers of fibre material, wherein in that case also, in accordance with the invention, disposed between the stepped inner layers 2 are intermediate layers 3 which extend over the entire length of the spring.

Figure 6:
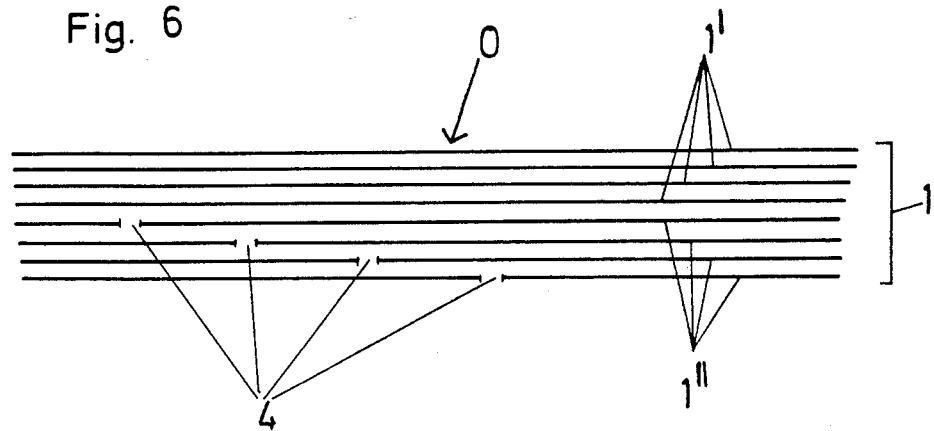
Figure 7:
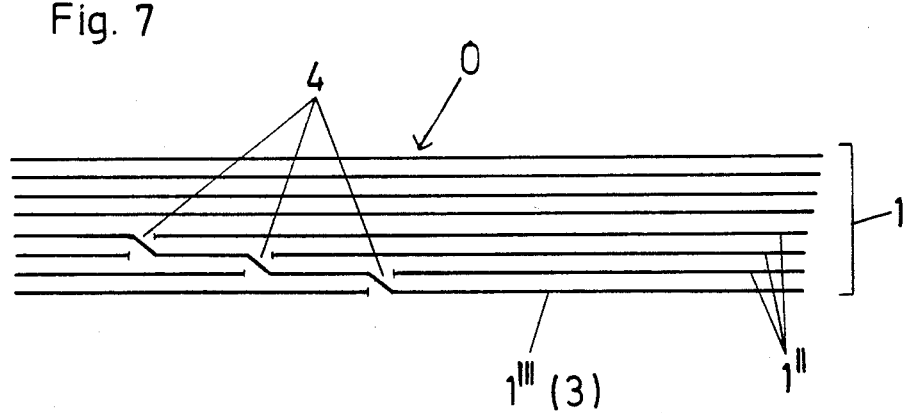

As already stated, another possible way of reducing the shear stresses at the ends of the spring provides that the layers of fibre material, which in themselves are continuous, are also interrupted in the region of the ends. That situation is illustrated for example in FIG. 6. The outermost layers 1' of fibre material remain uninterrupted; in regard to the other layers, as indicated at 1", the interruptions 4 are stepped from top front to bottom rear. FIGS. 6 and 7 only show the outer layers 1 which are adjacent to the spring surface O. The inner layers or the intermediate layers of fibre material may be arranged for example as shown in FIGS. 3 to 5, possibly even as shown in FIG. 2.

In the event of the outer layers 1 of fibre material being interrupted in the region of the ends of the spring, then as shown in FIG. 7, the innermost ones of the outer layers, which are furthest removed from the surface O of the spring (as indicated by 1''') are displaced outwardly through the points of separation or interruption 4 of the layers 1'' which are disposed thereover. The layer 1' which is displaced outwardly with its end could also be the outermost one of the intermediate layers 3 according to the invention. In addition, it is also possible for two or more superposed continuous layers of fibre material, like the individual layer 1', to be displaced outwardly with its end, in the manner shown in FIG. 7. Finally, there is also the possibility of one or more layers of fibre material being taken from one side of the central plane to the other. Even a displacement of a few millimeters prevents the spring body from splitting open along the central plane which is generally loaded in shear. The displaced layers of fibre material cannot tear due to the shear forces which occur. In the event of excessive loadings, the rupture line will extend along the above-mentioned layer of fibre material, but then goes into the region which has a lower level of shear stress so that greater forces would be necessary to destroy the spring, and the leaf spring is therefore stronger.

Another possible way of making a leaf spring of composite fibre plastics material more durable provides that the layers of fibre material are arranged asymmetrically with respect to the central plane of the leaf spring, either in respect of the outer continuous layers of fibre material or in respect of the arrangement of the stepped inner layers of fibre material. Experience has shown that a leaf spring of composite fibre material, for example consisting of glass fibre plastics material, if it does not split open at its longitudinal central plane when subjected to multiple loadings, slowly breaks up on the tension side. Individual fibres, fibre strands or also layers of greater or smaller thickness first break away from the spring body. That is an indication that the elongation tension at the tension side is rather too high while the compression side on the other hand is not loaded to its limit. By arranging the layers of fibre material asymmetrically with respect to the longitudinal central plane of the leaf spring, in such a way as to favor the tension side thereof, with the same loading the percentage elongation at the tension side can be reduced while the percentage upsetting effect at the compression side can be increased. That asymmetrical arrangement of the layers of fibre material is advantageously combined with a laminar configuration of the inner layers of fibre material in accordance with the lamination system shown by means of the embodiments illustrated in FIGS. 3 to 7. By virtue of that combination of the asymmetrical arrangement of the layers of fibre material with the above-mentioned lamination system, the neutral zone is no longer clearly defined, that is to say it becomes rather 'diffuse'. That also has the effect of reducing the shear stress peaks at the end of the spring.

By virtue of the features according to the invention, leaf springs of composite fibre materials may be so designed that, in regard to dynamic testing or in a practical situation, as a statistical average, when subjected to overloading, they become useless in equal parts due to splitting open in the longitudinal direction and due to destruction of the tension or compression zone. The material used is then utilised to its optimum and the leaf spring is at its strongest.

The specific arrangement selected for the layers of fibre material in accordance with the teaching of the present invention depends on a number of factors, such as for example the ratio of the spring length to the spring thickness, the shape of the spring at full load (still positively curved, flat or negatively curved), and in addition whether it is an axle-guiding or non-axle-guiding spring, and so on.

What is claimed is:

1. A leaf spring of composite fibre plastics material, said leaf spring having longitudinal ends spaced apart in a longitudinal direction and a thickness which decreases towards at least one of said ends from a region of maximum thickness and with a width which is substantially the same over at least part of the entire length, comprising a plurality of fibre material layers which are disposed in superposed relationship and which are embedded in a synthetic resin matrix, said layers including outer fibre material layers which extend over the entire length of the leaf spring in said longitudinal direction and which are associated with tension and compression zones which are located on opposite sides of a neutral zone of the spring, said layers further including shorter inner fibre material layers having lengths in said longitudinal direction which are stepped in a direction towards the neutral zone, and said layers further including intermediate layers arranged in the region between the neutral zone and the tension and compression zones respectively, said intermediate layers being between adjacent inner layers of fibre material, each of said intermediate layers having a length which is greater than the length of the adjacent inner layers of fibre material, the length of at least one of the intermediate layers of fibre material being substantially equal to the length of the outer layers of fibre material and the lengths of the remainder of the intermediate layers of fibre material being shorter than the outer layers of fibre material and being stepped in a direction towards the neutral zone.

2. A leaf spring of composite fibre plastics material, with a thickness which essentially decreases, towards at least one side, in the longitudinal direction from a region of maximum thickness, and with a width which is substantially the same over the entire length, comprising a plurality of fibre material layers (1, 2, 3) which are disposed in superposed relationship and which are embedded in a synthetic resin matrix, wherein there are provided outer fibre material layers (1) which extend over the entire length of the length spring and which are associated with tension and compression zones, and shorter inner fibre material layers (2) of a length which is stepped in a direction towards a neutral zone, and wherein arranged in the region between the neutral zone (N) and the tension and compression zones respectively, in addition to the stepped inner layers (2) of fibre material, are also intermediate layers (3, 3') of fibre material, the length of which is greater than the length of the adjacent inner layers (2) of fibre material, the length of the inner layers (2) of fibre material firstly decreasing in a direction towards the neutral zone (N) and then increasing again to the neutral zone (N), and the intermediate layers (3) being arranged both in the inner layer region of decreasing length and also in the inner layer region of increasing length, the intermediate layers (3) of fibre material being greater in length than the adjacent inner layers (2) of fibre material.

3. A leaf spring according to claim 2 characterized in that at least one of the outer layers and at least one of the intermediate layers are continuous and the sum of the number of outer continuous layers and the number of the continuous intermediate layers of fibre material is at least approximately equal to half the number of all the layers of fibre material.

4. A leaf spring according to claim 3 characterized in that of the continuous layers of fibre material at least 60 to 70% are in the form of outer layers and up to 30 to 40% are in the form of continuous intermediate layers.

5. A leaf spring according to claim 2 characterized in that at least one of the layers selected from the group consisting of the outer layers and the intermediate layers are transversely interrupted to form separations in the region of the longitudinals ends.

6. A leaf spring according to claim 3 characterized in that the spacing of the locations of the separations from the end of the spring increases in proportion to an increasing distance of the respective outer layer of fibre material from the surface of the spring.

7. A leaf spring according to claim 5 characterized in that at least one of layers selected from the group consisting of the continuous outer layers of fibre material, which are most remote from the surface of the spring, and the continuous intermediate layers of fibre material, is passed with its end region through the locations of separations of the interrupted layers of fibre material, to closer to the surface of the spring.

8. A leaf spring according to claim 2 characterized in that the layers of fibre material are arranged asymmetrically with respect to the longitudinal central plane of the leaf spring.

9. A leaf spring according to claim 8 characterized in that at least one of the outer layers and the intermediate layers include continuous layers and a larger number of the continuous layers of fibre material is provided on the side of the longitudinal central plane which is associated with the tension zone.

10. A leaf spring of composite fibre plastics material, with a thickness which essentially decreases, towards at least one side, in the longitudinal direction from a region of maximum thickness, and with a width which is substantially the same over the entire length, comprising a plurality of fibre material layers (1, 2, 3) which are disposed in superposed relationship and which are embedded in a synthetic resin matrix, wherein there are provided outer fibre material layers (1) which extend over the entire length of the leaf spring and which are associated with tension and compression zones, and shorter inner fibre material layers (2) of a length which is stepped in a direction towards a neutral zone, and wherein at least some of the outer layers are transversely interrupted to form separations in the region of the longitudinal ends, in the region of a force-applying means and at different spacings from the end of the spring, the spacing of the locations of separations (4) from the end of the spring increasing in proportion to an increasing distance of the respective outer layer (1") of fibre material from the surface (O) of the spring.

11. A leaf spring according to claim 10 characterized in that the spacing of the locations of separation (4) from the end of the spring increases in proportion to an increasing distance of the respective outer layer (1") of fibre material from the surface (O) of the spring.

12. A leaf spring according to claim 10 characterized in that one of the group consisting of one or more of the continuous outer layers (1") of fibre material, being from the surface (O) of the spring, and one or more of the continuous intermediate layers (3) of fibre material, are passed with their end region through the locations of separation (4) of the interrupted layers (1") of fibre material, towards the surface of the spring.

13. A leaf spring of composite fibre plastics material, with a thickness which essentially decreases towards at least one side, in the longitudinal direction from a region of maximum thickness, and with a width which is substantially the same over the entire length, comprising a plurality of fibre material layers (1, 2, 3) which are disposed in superposed relationship and which are embedded in a synthetic resin matrix, wherein there are provided outer fibre material layers (1) which extend over the entire length of the leaf spring and which are associated with tension and compression zones and shorter inner fibre material layers (2) of a length which is stepped in a direction towards a neutral zone, wherein at least one of the outer layers are transversely interrupted to form separations in the region of the longitudinal ends, in the region of a force-applying means and at different spacings from the ends of the spring, at least one of the continuous outer layers (1") of fibre material, being remote from the surface (O) of the spring, being passed with its end region through the locations of the separations (4) of the interrupted layers (1") of fibre material, toward the surface of the spring.

* * * * *